United States Patent
Jennings (10) Patent No.: US 7,548,364 B2
(45) Date of Patent: Jun. 16, 2009

(54) ULTRA-FAST BEAM DITHERING WITH SURFACE ACOUSTIC WAVE MODULATOR

(75) Inventor: Dean Jennings, Beverly, MA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 11/461,395

(22) Filed: Jul. 31, 2006

(65) Prior Publication Data

US 2008/0024855 A1   Jan. 31, 2008

(51) Int. Cl.
G02F 1/11 (2006.01)
G02F 1/33 (2006.01)

(52) U.S. Cl. .................... 359/285; 359/305
(58) Field of Classification Search ............. 359/285
See application file for complete search history.

(56) References Cited

U.S. PATENT DOCUMENTS

| | | | |
|---|---|---|---|
| 3,633,999 A | 1/1972 | Buckles | |
| 4,139,277 A * | 2/1979 | Berg et al. | 359/285 |
| 4,380,864 A | 4/1983 | Das | |
| 4,439,245 A | 3/1984 | Wu | |
| 4,474,467 A | 10/1984 | Hardy et al. | |
| 4,475,027 A | 10/1984 | Pressley | |
| 4,511,220 A | 4/1985 | Scully | |
| 4,619,508 A | 10/1986 | Shibuya et al. | |
| 4,744,615 A | 5/1988 | Fan et al. | |
| 4,849,371 A | 7/1989 | Hansen et al. | |
| 4,851,978 A | 7/1989 | Ichihara | |
| 5,002,349 A * | 3/1991 | Cheung et al. | 385/1 |
| 5,061,025 A | 10/1991 | Debesis | |
| 5,109,465 A | 4/1992 | Klopotek | |
| 5,182,170 A | 1/1993 | Marcus et al. | |
| 5,224,200 A | 6/1993 | Rasmussen et al. | |
| 5,233,460 A | 8/1993 | Partlo et al. | |
| 5,307,207 A | 4/1994 | Ichihara | |
| 5,315,427 A | 5/1994 | Rauch et al. | |
| 5,328,785 A | 7/1994 | Smith et al. | |
| 5,357,365 A | 10/1994 | Ipposhi et al. | |
| 5,400,171 A * | 3/1995 | Song | 359/285 |

(Continued)

FOREIGN PATENT DOCUMENTS

EP    206764    12/1986

(Continued)

OTHER PUBLICATIONS

PCT International Search Report and Written Opinion dated Aug. 27, 2008 for International Application No. PCT/US2007/74248.

(Continued)

*Primary Examiner*—Jordan M. Schwartz
*Assistant Examiner*—James C Jones
(74) *Attorney, Agent, or Firm*—Patterson & Sheridan, LLP (57) ABSTRACT

An apparatus for processing a coherent light pulse comprises a piezoelectric material having an optical interface surface and a surface acoustic wave (SAW) producing device disposed on the piezoelectric material. A coherent light pulse is dithered at a high frequency when it is reflected off of or transmitted through the optical interface surface. The SAW-producing device may be adapted to generate a travelling SAW or a standing SAW on the optical interface surface.

13 Claims, 9 Drawing Sheets

U.S. PATENT DOCUMENTS

| | | | |
|---|---|---|---|
| 5,418,866 A * | 5/1995 | Chu | 385/7 |
| 5,453,814 A | 9/1995 | Aiyer | |
| 5,561,081 A | 10/1996 | Takenouchi et al. | |
| 5,591,668 A | 1/1997 | Maegawa et al. | |
| 5,610,733 A | 3/1997 | Feldman et al. | |
| 5,621,529 A | 4/1997 | Gordon et al. | |
| 5,662,410 A | 9/1997 | Suganuma | |
| 5,699,191 A | 12/1997 | Fork | |
| 5,754,278 A | 5/1998 | Kurtz | |
| 5,888,888 A | 3/1999 | Talwar et al. | |
| 5,956,603 A | 9/1999 | Talwar et al. | |
| 6,191,887 B1 | 2/2001 | Michaloski et al. | |
| 6,212,012 B1 | 4/2001 | Tanaka | |
| 6,274,488 B1 | 8/2001 | Talwar et al. | |
| 6,282,357 B1 * | 8/2001 | Kadota et al. | 385/129 |
| 6,297,135 B1 | 10/2001 | Talwar et al. | |
| 6,300,208 B1 | 10/2001 | Talwar et al. | |
| 6,303,476 B1 | 10/2001 | Hawryluk et al. | |
| 6,324,195 B1 | 11/2001 | Suzuki et al. | |
| 6,348,076 B1 | 2/2002 | Canaperi et al. | |
| 6,365,476 B1 | 4/2002 | Talwar et al. | |
| 6,366,308 B1 | 4/2002 | Hawryluk et al. | |
| 6,376,806 B2 | 4/2002 | Yoo | |
| 6,383,956 B2 | 5/2002 | Hawryluk et al. | |
| 6,387,803 B2 | 5/2002 | Talwar et al. | |
| 6,388,297 B1 | 5/2002 | Talwar et al. | |
| 6,420,264 B1 | 7/2002 | Talwar et al. | |
| 6,466,706 B1 | 10/2002 | Go et al. | |
| 6,479,821 B1 | 11/2002 | Hawryluk et al. | |
| 6,495,390 B2 | 12/2002 | Hawryluk et al. | |
| 6,545,248 B2 | 4/2003 | Tanaka et al. | |
| 6,549,247 B2 * | 4/2003 | Toda | 349/2 |
| 6,570,656 B1 | 5/2003 | Owens, Jr. et al. | |
| 6,577,429 B1 | 6/2003 | Kurtz et al. | |
| 6,594,090 B2 | 7/2003 | Kruschwitz et al. | |
| 6,597,430 B1 | 7/2003 | Nishi et al. | |
| 6,635,541 B1 | 10/2003 | Talwar et al. | |
| 6,635,588 B1 | 10/2003 | Hawryluk et al. | |
| 6,645,838 B1 | 11/2003 | Talwar et al. | |
| 6,717,105 B1 | 4/2004 | Okamoto et al. | |
| 6,728,039 B2 | 4/2004 | Tanaka | |
| 6,747,245 B2 | 6/2004 | Talwar et al. | |
| 6,750,424 B2 | 6/2004 | Tanaka | |
| 6,777,317 B2 | 8/2004 | Seibel et al. | |
| 6,825,101 B1 | 11/2004 | Hawryluk et al. | |
| 6,844,250 B1 | 1/2005 | Wang et al. | |
| 6,849,831 B2 | 2/2005 | Timans et al. | |
| 6,951,996 B2 | 10/2005 | Timans et al. | |
| 6,956,878 B1 | 10/2005 | Trisnadi | |
| 6,982,476 B2 | 1/2006 | Cleeves et al. | |
| 6,987,240 B2 | 1/2006 | Jennings et al. | |
| 7,005,601 B2 | 2/2006 | Jennings | |
| 7,097,709 B2 | 8/2006 | Okamoto et al. | |
| 7,098,155 B2 | 8/2006 | Talwar et al. | |
| 7,105,048 B2 | 9/2006 | Yamazaki et al. | |
| 7,135,392 B1 | 11/2006 | Adams et al. | |
| 7,145,104 B2 | 12/2006 | Talwar et al. | |
| 7,154,066 B2 | 12/2006 | Talwar et al. | |
| 7,157,660 B2 | 1/2007 | Talwar et al. | |
| 7,276,457 B2 | 10/2007 | Yoo | |
| 2001/0039098 A1 | 11/2001 | Lu | |
| 2002/0067918 A1 | 6/2002 | Camm et al. | |
| 2002/0111043 A1 | 8/2002 | Mahawili | |
| 2003/0040130 A1 | 2/2003 | Mayur et al. | |
| 2003/0138988 A1 | 7/2003 | Murakami et al. | |
| 2003/0146458 A1 | 8/2003 | Horiuchi et al. | |
| 2005/0139961 A1 | 6/2005 | Brunner et al. | |
| 2006/0075820 A1 * | 4/2006 | Cobianu et al. | 73/703 |
| 2006/0102607 A1 | 5/2006 | Adams et al. | |
| 2006/0222041 A1 | 10/2006 | Moriwaka | |
| 2007/0032004 A1 | 2/2007 | Ramaswamy et al. | |

FOREIGN PATENT DOCUMENTS

WO    WO-2005/104265    11/2005

OTHER PUBLICATIONS

Rudge et al., "Fly's-Eye Lens Technique for Generating Semiconductor Device Fabrication Masks", IBM Journal Apr. 1963, pp. 146-150.

Michael Pate, "Fly's Eye Arrays for Uniform Illumination in Digital Projector Optics", ZEMAX Digital Projection Optics, Apr. 2006, pp. 1-3.

Lin et al., "Characterization of Excimer Lasers for Application to Lenslet Array Homogenizers", Optical Society of America, Applied Optics, vol. 40, No. 12, Apr. 2001, pp. 1931-1941.

Brown et al., "Multi-aperture Beam Integration Systems", Laser Beam Shaping, Chap 7, 273-311, Ed. Dickey, Holswade (2000).

Dorotek, "Beam Splitters", http://www.dorotek.de/cms/upload/pdf/optik/englisch/7Beam_splitters.pdf, pp. 1-6.

Melles Griot, "Beamsplitters: A Guide for Designers," The Photonics Design and Applications Handbook, 2002. http://www.mellesgriot.com/pdf/P_Handbook_Beamsplitters.pdf, pp. H-309-H-314.

Felch, S.B. et al. "Sub-Melt Laser Annealing Followed by Low-Temperature RTP for Minimized Diffusion", 2000 International Conference on Ion Implantation Technology Proceedings, Alpbach, Austria, Sep. 17-22, 2000, pp. 167-170, IEEE 00EX432, ISBN 0-7803-6462-7.

Liang, P.H. et al., "Ultrashort Laser-Pulse Annealing of Hydrogenated Amorphous Silicon", Applied Physics, A 26, pp. 39-43, Springer-Verlag, Germany, 1981.

U.S. Appl. No. 11/831,830.

U.S. Appl. No. 11/831,838.

International Search Report for PCT/US07/74245 dated Jul. 14, 2008.

* cited by examiner

ULTRA-FAST BEAM DITHERING WITH SURFACE ACOUSTIC WAVE MODULATOR

BACKGROUND OF THE INVENTION

1. Field of the Invention

Embodiments of the present invention generally relate to the fabrication of integrated circuits and more particularly to the thermal processing of a substrate using laser anneal.

2. Description of the Related Art

Thermal processing is required in the fabrication of integrated circuits formed in silicon wafers and other substrates, such as glass panels for displays. Required temperatures may range from relatively low temperatures, e.g., less than 250 degrees Celsius, to temperatures of 1000 degrees Celsius to 1400 degrees Celsius, and may be used for a variety of processes such as dopant implant annealing, crystallization, oxidation, nitridation, silicidation, and chemical vapor deposition as well as others.

For the very shallow circuit features required for advanced integrated circuits, it is desirable to minimize total thermal budget of a process while still achieving the required thermal processing. The thermal budget is considered the total time at which it is necessary for a substrate to remain at high temperatures to achieve the desired processing. In many applications, this time may be very short. In addition, it is often advantageous to only heat a very thin region at the surface of a layer.

Laser thermal processing (LTP) is one method of thermal processing that has a reduced thermal impact on the bulk of the substrate while facilitating the melting and recrystallization of a thin layer at the surface of the substrate. LTP utilizes short pulses of laser radiation to thermally anneal and activate the dopants in semiconductors as part of the process of forming a semiconductor device, such as a metal oxide semiconductor (MOS) device. Dopant activation via LTP is achieved by melting a thin layer of semiconductor material to diffuse the dopants within the molten region. During cooling, the molten material re-crystallizes, fixing the dopants into the lattice sites where they remain electrically active. To ensure that only a thin layer of the substrate surface is melted, the duration of the laser pulse is very short, e.g., on the order of 5 to 100 ns. The quantity of energy that must be delivered to produce the desired annealing result is on the order of about 0.1 J/cm$^2$ and greater.

Because of the relatively large quantity of energy required and the very short time interval in which it must be applied to the substrate, pulse lasers are the typical delivery mechanism utilized for the melting and recrystallization of the surface of a substrate. Other methods, such as lamps, cannot provide such a high energy input in such a short time interval.

In thermal processing, it is important to uniformly heat the structure being processed. One drawback to the use of pulse lasers for annealing substrates is the non-uniform illumination of a target area on the substrate due to coherence effects, such as interference fringes and laser speckle. In addition to having the ability to deliver a high energy pulse for a short time, lasers also produce light waves that often have high temporal and spatial coherence-though the degree of coherence depends strongly on the exact properties of the laser. Spatial coherence of laser beams may manifest itself as speckle patterns and diffraction fringes on the target area, which are caused by constructive and destructive interference of the largely coherent light waves. Hence, one point in a target area may be illuminated with essentially no light due to destructive interference while another point a few micrometers away may have overly bright illumination due to constructive interference, resulting in non-uniform illumination, and therefore non-uniform thermal processing, of the target area.

It is possible to spatially modulate the speckle and interference patterns of a coherent light beam over time so that, when averaged over a suitable time interval, each point on the target area of the light beam will experience uniform energy input. For example, a rotating light diffuser may be placed between the coherent light source and the target area. As the diffuser moves relative to the light source, e.g., via rotation or translation, the speckle and interference patterns present on the target area will also move and, when averaged over a time interval of appropriate duration, result in uniform illumination of the entire target area.

Because the duration of an LTP laser is so short, methods of laser modulation known in the art are unable to produce any significant effect on a coherent light source on the nanosecond timescale. To wit, mechanical motion of a lens and/or diffuser over such a brief time is problematic since spinning a diffuser or moving a mirror fast enough to provide a benefit is mechanically impracticable. For example, a galvo mirror system may operate on the kHz timescale, whereas to produce one period of modulation over 5 ns, a method operating at 200 MHz is required. Other known methods, such as acousto-optic methods, are also too slow, since they operate on the 10's of kHz timescale and do not approach the MHz regime. Acousto-optic deflection of a coherent light source relies on the high-speed variation of the index of refraction of a light-transmitting material when bulk acoustic waves are passed therethrough.

Therefore, there is a need for a method and an apparatus that can reduce coherence effects present during LTP.

SUMMARY OF THE INVENTION

Embodiments of the present invention provide an apparatus used for reducing coherence effects on a substrate during LTP. In one embodiment, an apparatus for processing a coherent light pulse comprises a piezoelectric material having an optical interface surface and a surface acoustic wave (SAW) producing device disposed on the piezoelectric material. The optical interface surface may be a substantially light-reflecting surface or a substantially light-transmitting surface. The SAW-producing device may have an interdigital transducer (IDT) mounted on the piezoelectric material and adjacent the optical interface surface, wherein the IDT is oriented to propagate a traveling SAW across the optical interface surface. Alternatively, the SAW-producing device may have an IDT configured as a resonator comprising an electrode disposed on a first edge of the optical interface surface, a reflector disposed on a second edge of the light-reflecting surface, and a spacing between the electrode and the reflector, wherein the width of the spacing is selected to produce a standing SAW on the optical interface surface.

According to another embodiment, an apparatus for processing a substrate comprises a piezoelectric material having an optical interface surface, a surface acoustic wave (SAW) producing device disposed on the optical interface surface, a coherent light source adapted to direct a pulse of coherent light on the optical interface surface, wherein the energy content of the light pulse is at least about 0.1 J/cm$^2$, and a substrate support configured to position the substrate in the path of the light pulse

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numerals have been used, where applicable, to designate identical elements that are common between figures. It is contemplated that features of one embodiment may be incorporated in other embodiments without further recitation.

DETAILED DESCRIPTION

Aspects of the invention contemplate apparatus that are adapted to eliminate coherence effects on a substrate by spatially modulating, or "dithering," a beam of coherent light at a very high frequency. In this context, the term dithering refers to randomizing the path of a light beam on a small scale. The very high frequency dithering of the coherent light beam is accomplished by producing a surface acoustic wave (SAW) on an optical interface surface, the optical interface surface then interacting with said beam via reflection or transmission of said beam.

Figure 1A:
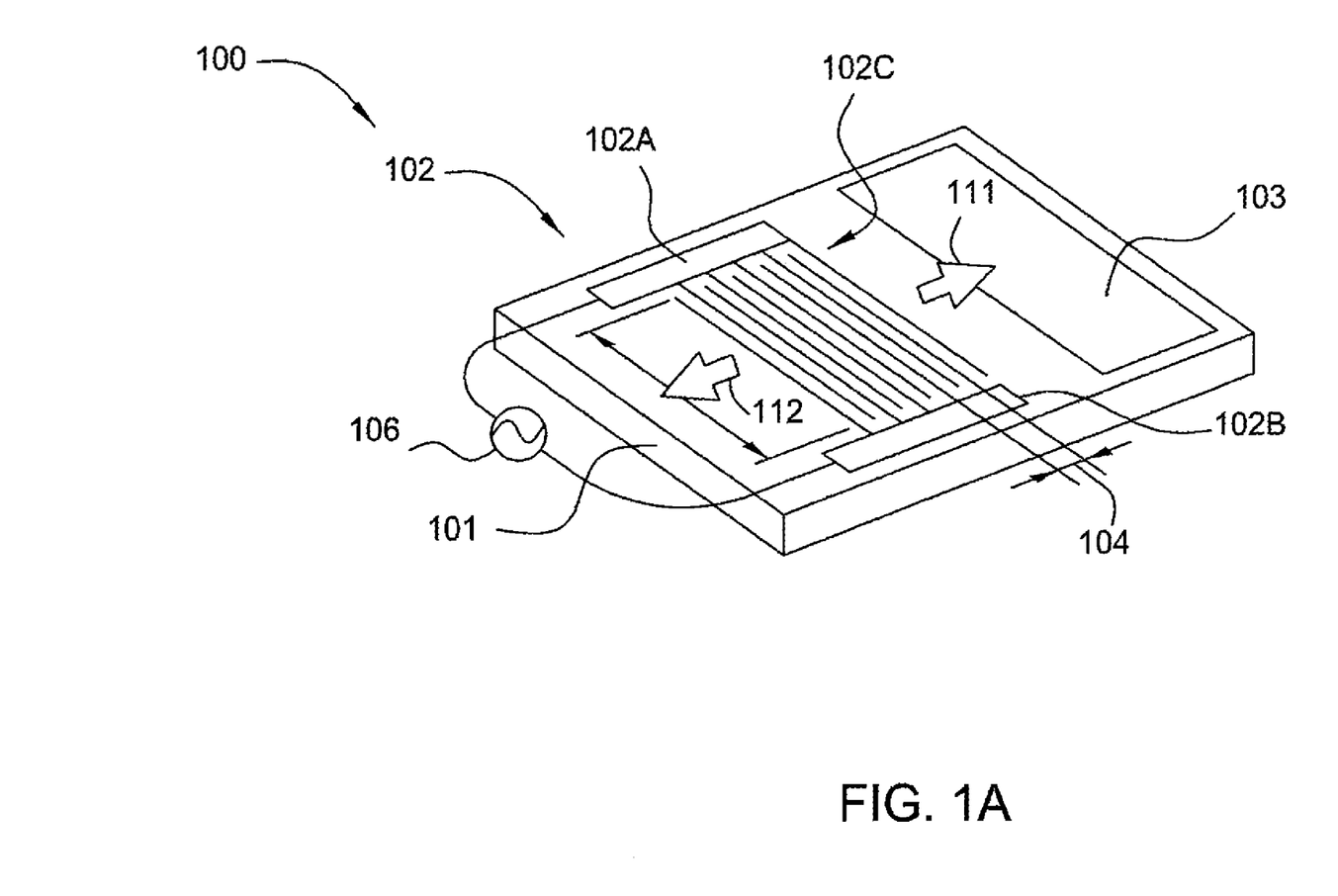
FIG. 1A illustrates a beam modulator capable of spatially modulating a coherent light pulse on the nanosecond timescale according to one embodiment of the invention.

FIG. 1A illustrates one embodiment of an apparatus, beam modulator 100, that is capable of spatially modulating a coherent light pulse on the nanosecond timescale. Beam modulator 100 includes a piezoelectric material 101, an interdigital transducer (IDT) 102 mounted on the surface of piezoelectric material 101, and a radio frequency (RF) driver 106, which is electrically coupled to IDT 102. Disposed on a surface of beam modulator 101 is an optical interface region 103. Optical interface region 103 is adjacent to IDT 102. IDT 102 includes a first electrode 102A and a second electrode 102B, each having a plurality of parallel, overlapping fingers 102C separated at a uniform spacing 104. Optical interface region 103 may be a light-reflecting region or a light-transmitting region.

First electrode 102A, second electrode 102B, and fingers 102C are disposed on the same surface of piezoelectric material 101 as optical interface region 103 and oriented so that the travelling wave of a SAW generated by IDT 102 moves across optical interface region 103. First electrode 102A, second electrode 102B, and fingers 102C are not located in optical interface region 103. Because these elements of IDT 102 are preferably metallic, they will be damaged by and/or act as a diffraction grating for any high energy light pulse incident thereon.

Piezoelectric material 101 may be any material that has suitable piezoelectric and optical properties. Optically, piezoelectric material 101 is highly light-reflecting of the wavelength or wavelengths of light to be modulated by beam modulator 100. Even a small amount of absorption of incident light may cause serious heating of the piezoelectric material due to the high energy intensity associated with pulse lasers, which may produce light pulses providing at least about 0.1 J/cm$^2$. Piezoelectric material 101 has a piezoelectric response capable of producing a SAW with a large enough amplitude to adequately modulate a beam of coherent light when piezoelectric material 101 is oscillated by IDT 102 at the frequency desired. For example, for coherent light sources typically used for LTP, it is desirable for the SAW to produce an angle of deviation of about ±0.5 to about ±1.5 degrees on the surface of the piezoelectric material. The angle of deviation produced by a SAW on a surface is further described in conjunction with FIG. 1B below.

In one embodiment, the piezoelectric material 101 is crystalline quartz, which may be used as a reflecting medium or a transmitting medium with very low absorption for the wavelengths of light preferred for laser anneal, e.g., from the deep UV to the far IR. Deep UV may include wavelengths as short as about 10 nm and far IR wavelengths may extend to as long as about 1000 μm. In addition to its optical properties, crystalline quartz may also possess a piezoelectric response that produces a SAW with suitable amplitude for coherent light beam dithering when excited by an IDT with a fundamental frequency of about 200 MHz.

In general operation, RF driver 106 produces a high frequency alternating voltage between first electrode 102A and second electrode 102B, generating a surface acoustic wave that travels across the surface of piezoelectric material 101 in directions 111, 112. Directions 111, 112 define the axis of transmission of the SAW. A coherent light beam (not shown) is reflected off of or transmitted through the optical interface region 103. Because the surface of optical interface region 103 may be elastically deformed by the SAW at a very high frequency, for example on the order of about 100 MHz, the reflected or transmitted coherent light beam is spatially modulated at said frequency, thereby producing uniform illumination of a target area (not shown) that is free of speckle and interference fringes when averaged over a suitable time interval. Due to the losses associated with reflection, which includes light energy that is transmitted or absorbed by optical interface region 103, optical interface region 103 may be a light-transmitting region through which the coherent light beam passes. Energy loss associated with reflection from a first surface reflector may be on the order of 4% to 8%. When optical interface region 103 is a light-transmitting region, reflective losses may be minimized by directing coherent light normal to the surface of optical interface region 103 and by disposing an anti-reflective coating (not shown) on the side of piezoelectric material 101 opposite optical interface region 103.

A suitable time interval over which a coherent light beam is modulated, i.e., the duration of the laser pulse, may be two or more times the period of oscillation of the SAW that is elastically deforming the surface of optical interface region 103. For a SAW with a fundamental frequency of 100 MHz the period of oscillation is 10 ns. A suitable time interval for dithering of a coherent light pulse may be about 20 or more ns. If the duration of the light pulse is shorter than about 20 ns, a higher frequency SAW may be desired for better averaging of the pulse. The coherent light beam that interacts with optical interface region 103 remains coherent at every instant in time. However, the resultant quantity of energy imparted to any point in a target area is substantially uniform and free of coherence effects, such as speckle and interference fringes, due to the time-averaging of the dithered, or spatially modulated, beam of coherent light.

Figure 1B:
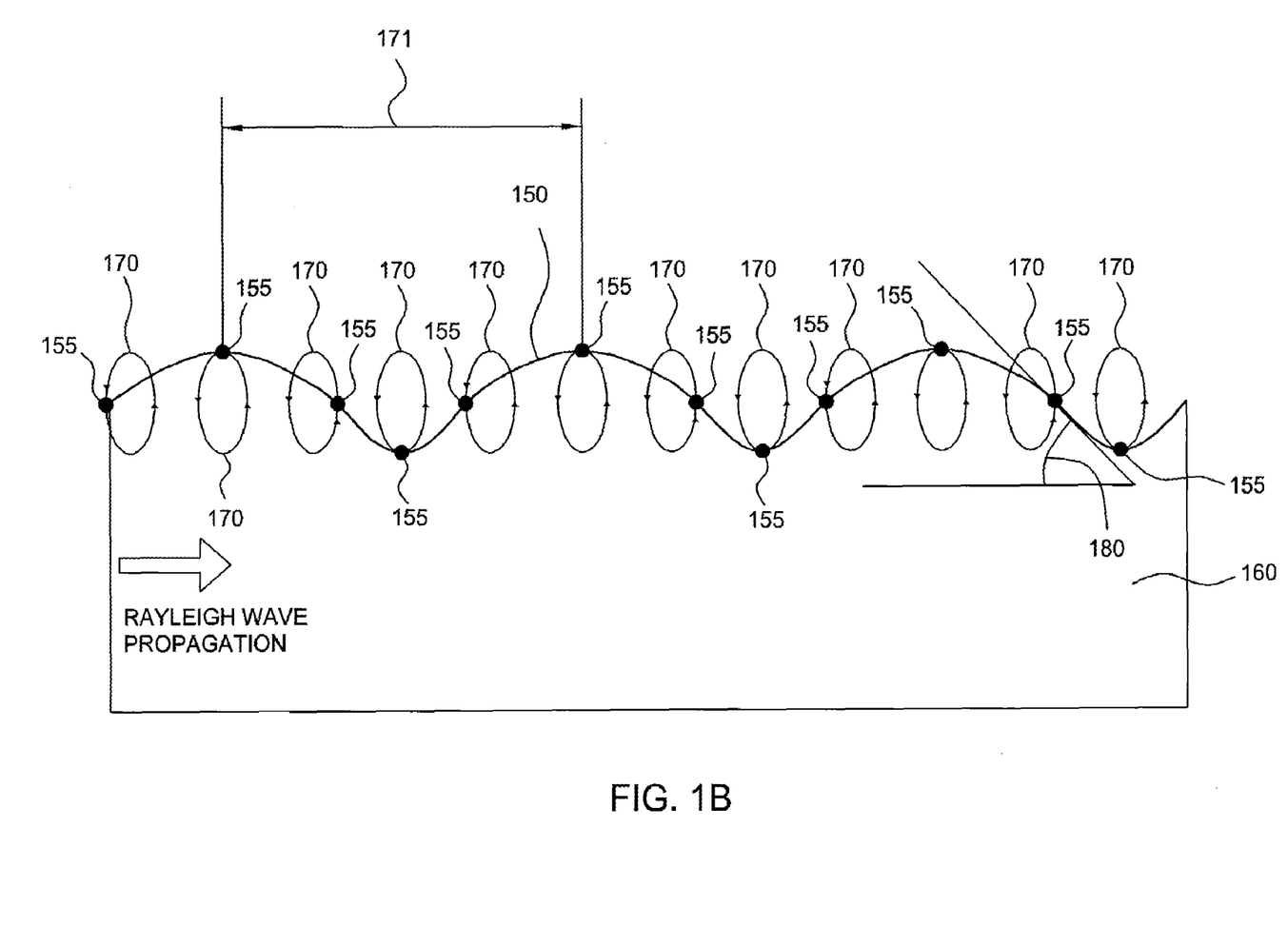
FIG. 1B schematically illustrates Rayleigh wave propagation across a surface of an elastic material.

FIG. 1B schematically illustrates Rayleigh wave propagation across a surface 150 of elastic material 160. FIG. 1B also illustrates the cyclical movement 170 of discrete points 155 on the surface 150. A Rayleigh wave is a mechanical wave that moves across a surface, such as a "ground roll" wave associated with earthquakes. Surface acoustic waves are one variety of Rayleigh wave. A SAW is an acoustic wave produced on the surface of a material having some elasticity, With an amplitude that typically decays exponentially with the depth of the substrate. A SAW may be a standing wave or a travelling wave. In the embodiment illustrated in FIG. 1A, the SAW produced by IDT 102 is a travelling wave that moves across optical interface region 103 of piezoelectric material 101. A SAW may be generated on the surface of a piezoelectric material by applying an alternating high frequency voltage between the electrodes of an IDT mounted on the piezoelectric material. The fundamental frequency of a SAW is equal to the acoustic velocity of the SAW divided by the acoustic wavelength of the SAW. Because the acoustic velocity of a SAW through a particular material is fixed, and because the acoustic wavelength is determined by the width of and spacing between the parallel, overlapping fingers of the IDT, the fundamental frequency of a SAW may be chosen by selecting an appropriate value of the uniform spacing 104 between the fingers 102C of IDT 102. The suitable width of uniform spacing 104 depends on the fundamental frequency desired, and the acoustic velocity of the piezoelectric material 101.

As a SAW travels across the surface 150 of elastic material 160, the surface 150 is elastically deformed at a high frequency, causing each discrete point 155 on the surface 150 to undergo cyclical movement 170, as illustrated in FIG. 1B. The cyclical movement 170 causes the angle of deviation 180 of surface 150 at each discrete point 155 to change very quickly with time, constantly altering the resultant path of a light beam interacting with surface 150 when the surface is used as an optical interface surface. Non-zero values of angle of deviation 180 of surface 150 cause refraction of the light beam. Since the angle of deviation 180 of surface 150 is varying from a minimum value to a maximum value at any one point, e.g., −1.5 degrees to 1.5 degrees, there is an angular spread of refraction angles of the beam at each point on surface 150.

An IDT mounted on a piezoelectric material having the necessary optical and piezoelectric properties may produce a SAW on the surface of the piezoelectric material that may effectively eliminate the coherence effects of a coherent light beam that optically interacts with said material. This is because the SAW so produced may have great enough amplitude, which corresponds to cyclical movement 170, and high enough frequency, which is determined by acoustic wavelength 171, to modulate the beam on a very short timescale. Since the frequency of a SAW on a piezoelectric material may be on the order of 1 or more GHz, a coherent light source may be modulated and time-averaged over a very short period of time. For example, a SAW generated on a crystalline quartz substrate and having a fundamental frequency of about 200 MHz modulates the angle of deviation of each point on the surface of the substrate through one cycle every 5 ns. For a laser anneal process in which a laser pulse of 40 ns is used, the coherent light beam is dithered 8 times, thereby averaging the resultant illumination of the pulse across the target area and reducing or eliminating coherence-related non-uniformities. The minimum amount of dithering required, i.e., the minimum number of cycles a pulse of coherent light is modulated, is application specific and may range from 2 cycles to 10 cycles or more, depending on factors such as wavelength of light used and the depth and composition of material to be melted, among other considerations.

Figure 2:
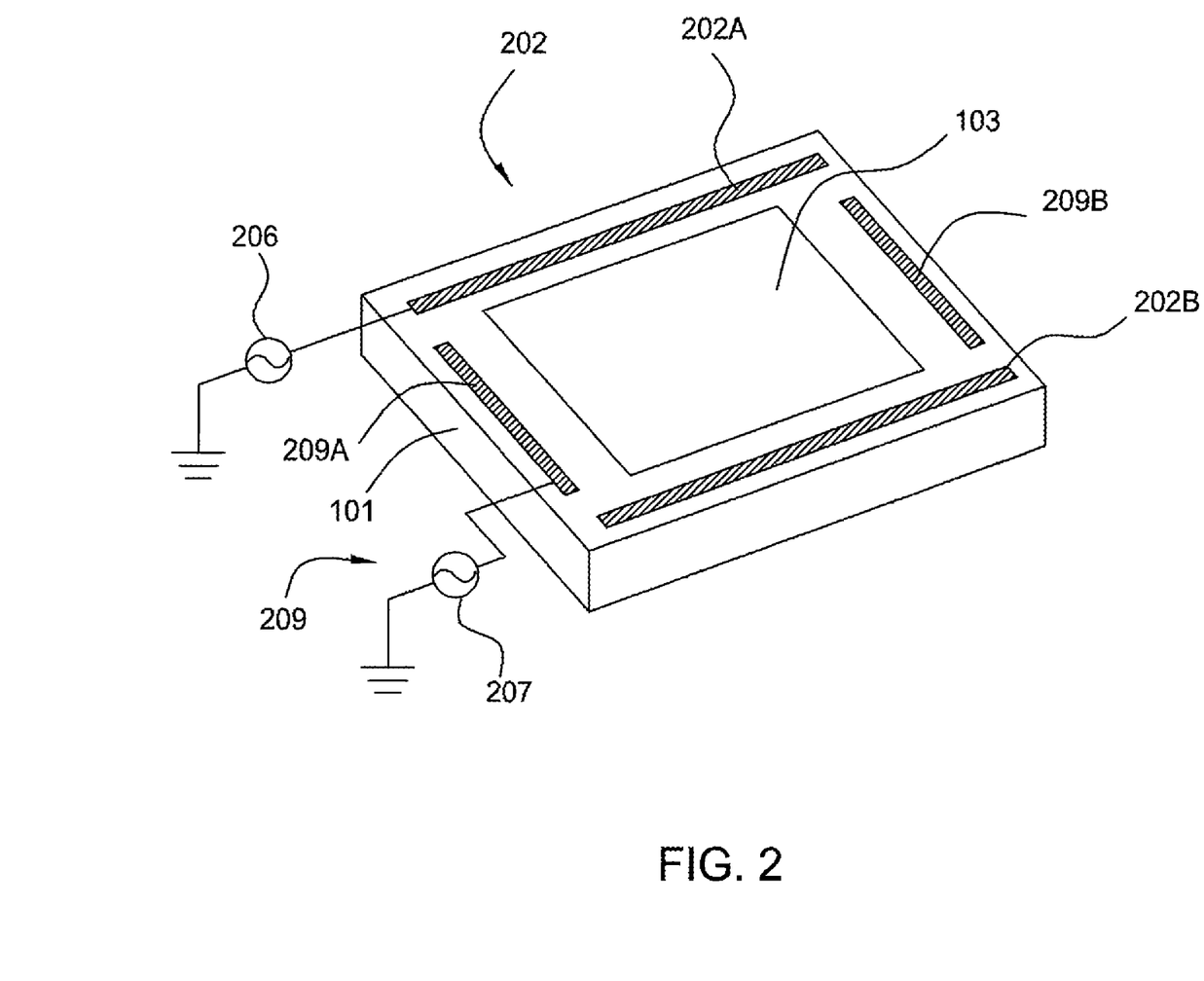
FIG. 2 is a schematic diagram of a beam modulator according to another aspect of the invention, wherein the surface acoustic wave used to modulate a coherent light beam is a standing wave.

FIG. 2 is a schematic diagram of a beam modulator 200 according to another embodiment of the invention, wherein the surface acoustic wave used to modulate a coherent light beam is a standing wave produced by an IDT that is configured as a resonator. Rather than a travelling wave, as produced in the aspect described above in conjunction with FIG. 1A, a standing SAW may be produced on the surface of a piezoelectric material using an IDT 202 configured as shown in FIG. 2, wherein IDT 202 includes an electrode 202A and a reflector 202B. Electrode 202A is disposed on a surface of piezoelectric material 101 and is electrically coupled to an RF driver 206. Reflector 202B is disposed on the same surface of piezoelectric material 101 and is substantially parallel to electrode 202A. Unlike electrode 202A, reflector 202B is not electrically coupled to driver 206. Optical interface region 103 should be located between electrode 202A and reflector 202B, so that the standing SAW formed therebetween is present on the surface of optical interface region 103.

When a voltage is applied to electrode 202A, the surface of piezoelectric material 101 deforms, and when a high frequency alternating signal from RF driver 206 is applied to electrode 202A, the surface of piezoelectric material 101 deforms sinusoidally, i.e., a SAW is produced thereon. The piezoelectric effect is essentially reversible, i.e., deformation of a piezoelectric material generates a voltage and application of a voltage to a piezoelectric material produces a deformation in the material. Because of this, when a SAW originating from electrode 202A and travelling across optical interface region 103 encounters reflector 202B, the SAW will induce an electromotive force in the reflector, which effectively bounces the SAW back across optical interface region 103. As noted above, the acoustic velocity of a SAW on a given material is fixed, therefore, a standing wave may be produced on optical interface region 103 by selecting an appropriate spacing between electrode 202A and reflector 202B that is based on the fundamental frequency of the SAW being produced. For example, in order to generate a standing wave on the surface of a crystalline quartz plate, wherein the fundamental frequency of the SAW is 200 MHz, a spacing between electrode 202A and 202B may be about 30 mm or any integral factor thereof, i.e., 60 mm, 90 mm, etc. Amplitude of the SAW produced thereby may be 25 nm or more.

An advantage of generating a SAW on an optical interface region that is a standing wave is the larger amplitude is that is produced for a given energy input. A larger amplitude of the SAW results in a larger angle of deviation of the surface of the optical interface region, thereby minimizing coherence effects by averaging them over a broader range of refraction angles during each cycle.

Referring back to the embodiment depicted in FIG. 2, in a preferred configuration, a standing wave may be generated on the optical interface surface 103 along two axes simultaneously. In addition to the standing wave produced between electrode 202A and reflector 202B of IDT 202, a second standing wave may be produced using a second IDT 209. The second IDT 209 includes an electrode 209A and a reflector 209B, which are similar in organization and disposition to the electrode 202A and the reflector 202B. The electrode 209A is electrically coupled to the second RF driver 207. In order to produce a second standing wave across the optical interface surface 103, electrode 209A and reflector 209B are not oriented parallel to electrode 202A and reflector 202B. In one embodiment, electrode 209A and reflector 209B are oriented substantially orthogonal to electrode 202A and reflector 202B, as illustrated in FIG. 2.

The invention further contemplates the use of more than two IDT's to produce multiple standing waves across optical interface surface 103. For example, three IDT's may be arranged peripherally around an optical interface surface in a hexagonal configuration. It is advantageous to produce two or more standing waves across an optical interface surface, for example with the apparatus depicted in FIG. 2, because dithering, i.e., averaging, of the coherent light beam may then be performed along multiple axes, thereby more effectively ameliorating coherence effects.

Figure 2A:
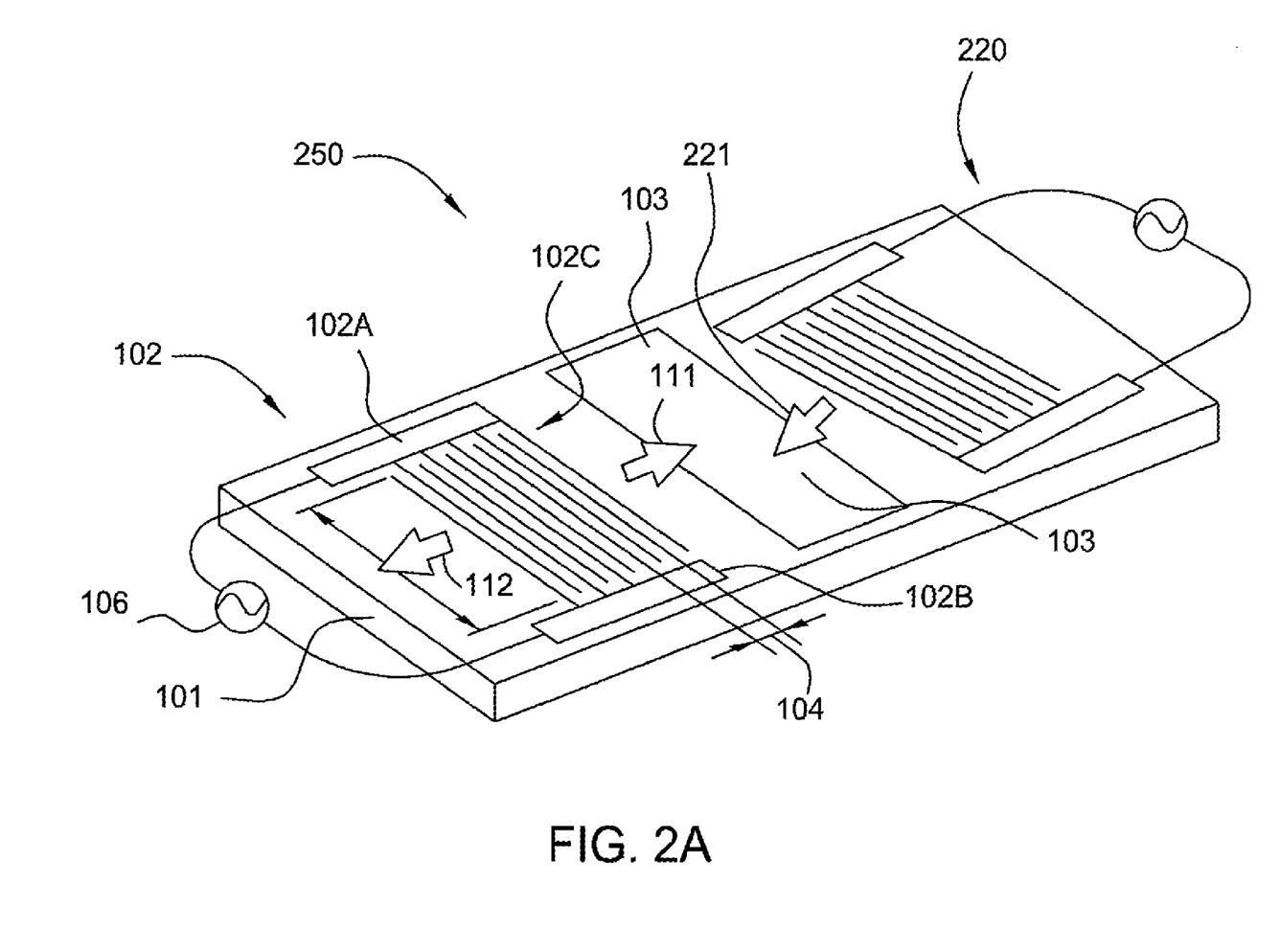
FIG. 2A illustrates an apparatus according to one embodiment of the invention wherein two IDT's produce unaligned traveling waves across an optical interface surface.

Similarly, improved dithering of an optical interface surface may also be realized by producing two or more traveling waves thereacross, if the axis of transmission of each traveling wave is substantially out of alignment with the axis of transmission of the other travelling waves. FIG. 2A illustrates an apparatus 250 according to one embodiment of the invention wherein two IDT's 102, 220 produce unaligned traveling waves across the optical interface surface 103. IDT 102 produces a traveling wave whose axis of transmission is parallel to direction 111, whereas IDT 220 produces a traveling wave whose axis of transmission is parallel to direction 221. Each traveling wave propagates across the optical interface surface 103. In so doing, the randomization of an incident coherent beam is increased since dithering of the optical interface surface 103 takes place along multiple axes.

Further, is also advantageous to produce two or more SAW's of different fundamental frequencies across an optical interface, for example by the apparatus depicted in FIG. 2 or 2A. Just as dithering is improved by the presence of multiple unaligned SAW's on an optical interface surface, multiple SAW's having different fundamental frequencies may also improve the randomization of an incident coherent light beam. This effect is true for both travelling or standing SAW's. Only a relatively small difference in the fundamental frequencies is required for the superposition of the different SAW's to further dither an optical interface surface, for example on the order of about 3% to 5%. For example, two SAW's applied to an optical interface with fundamental frequencies of 200 MHz and 210 MHz, respectively, may substantially improve the dithering of the optical interface surface.

In another aspect, a dove prism may be mounted to an optical interface surface. Dove prisms are shaped from a truncated right-angle prism so that a beam of light entering one of the sloped faces of the prism undergoes total internal reflection (TIR) from the inside of the longest face and emerges from the opposite sloped face. In so doing, a coherent light beam may be directed to the optical interface surface via TIR. TIR allows a coherent beam to be dithered by a SAW on an optical interface surface without altering the original direction of propagation of the beam and without undergoing the energy losses associated with a reflection scheme, such as a first surface reflection off of the optical interface surface.

TIR is an optical phenomenon that occurs when light travels through a medium having a higher refractive index encounters an interface with a medium having a lower refractive index. For example, TIR may occur when light passes through glass and encounters a glass/air interface, but not when light passes through air and encounters an air/glass interface. In general, when a light beam meets a boundary between two materials with different refractive indices, the light beam will be partially refracted by and partially reflected off of the boundary surface. However, for TIR to occur, the angle of incidence must be shallower than a critical angle, in which case the light beam will not cross the boundary at all. Instead, the light beam entirely reflects internally off the boundary. Dove prisms are adapted to refract a light beam from air onto an internal surface of the prism at an angle below the critical angle, and then to refract the reflected light beam back to the original path of said light beam.

Figure 3A:
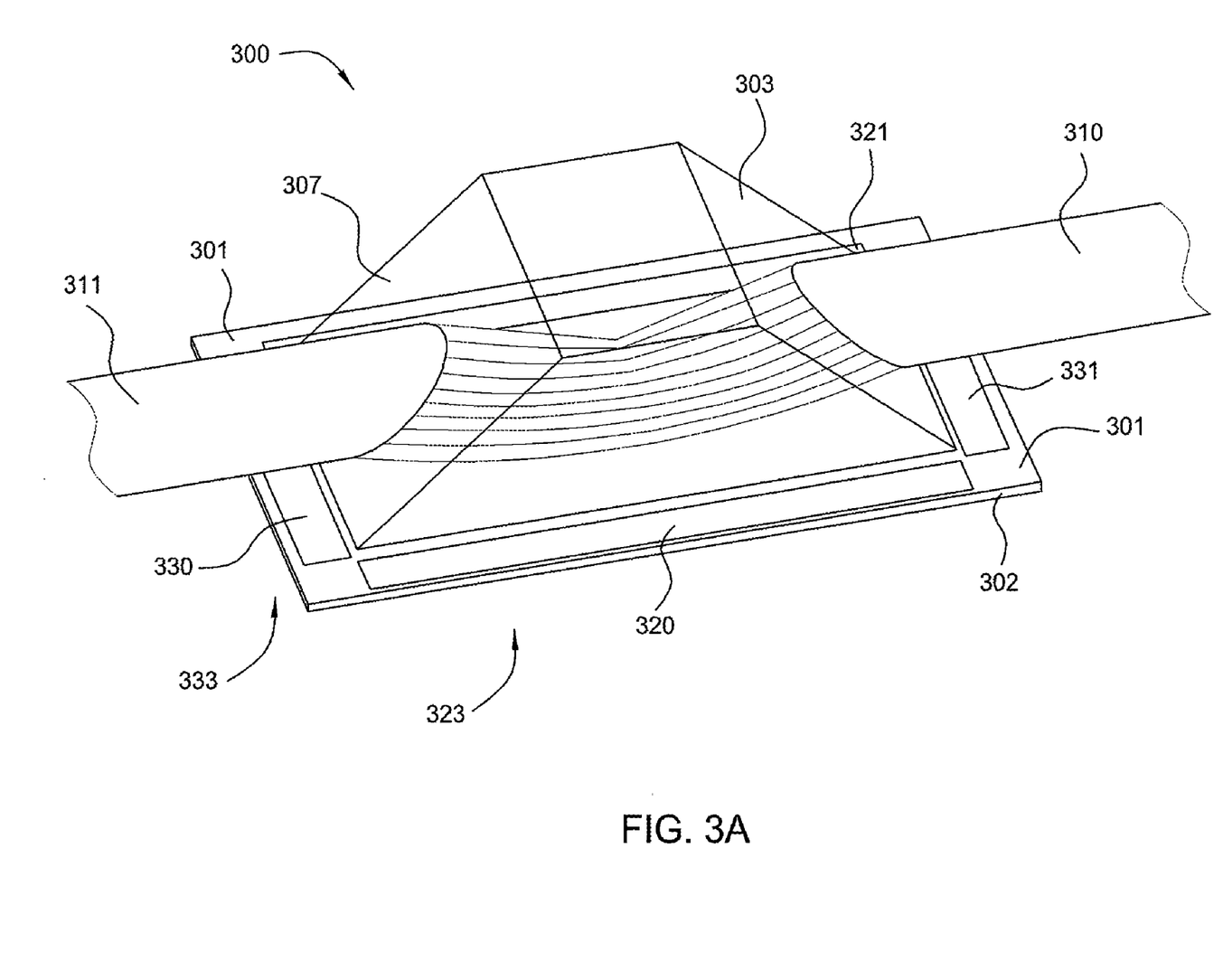
FIG. 3A is a perspective view of a dove prism mounted to the optical interface surface of a piezoelectric plate.
Figure 3B:
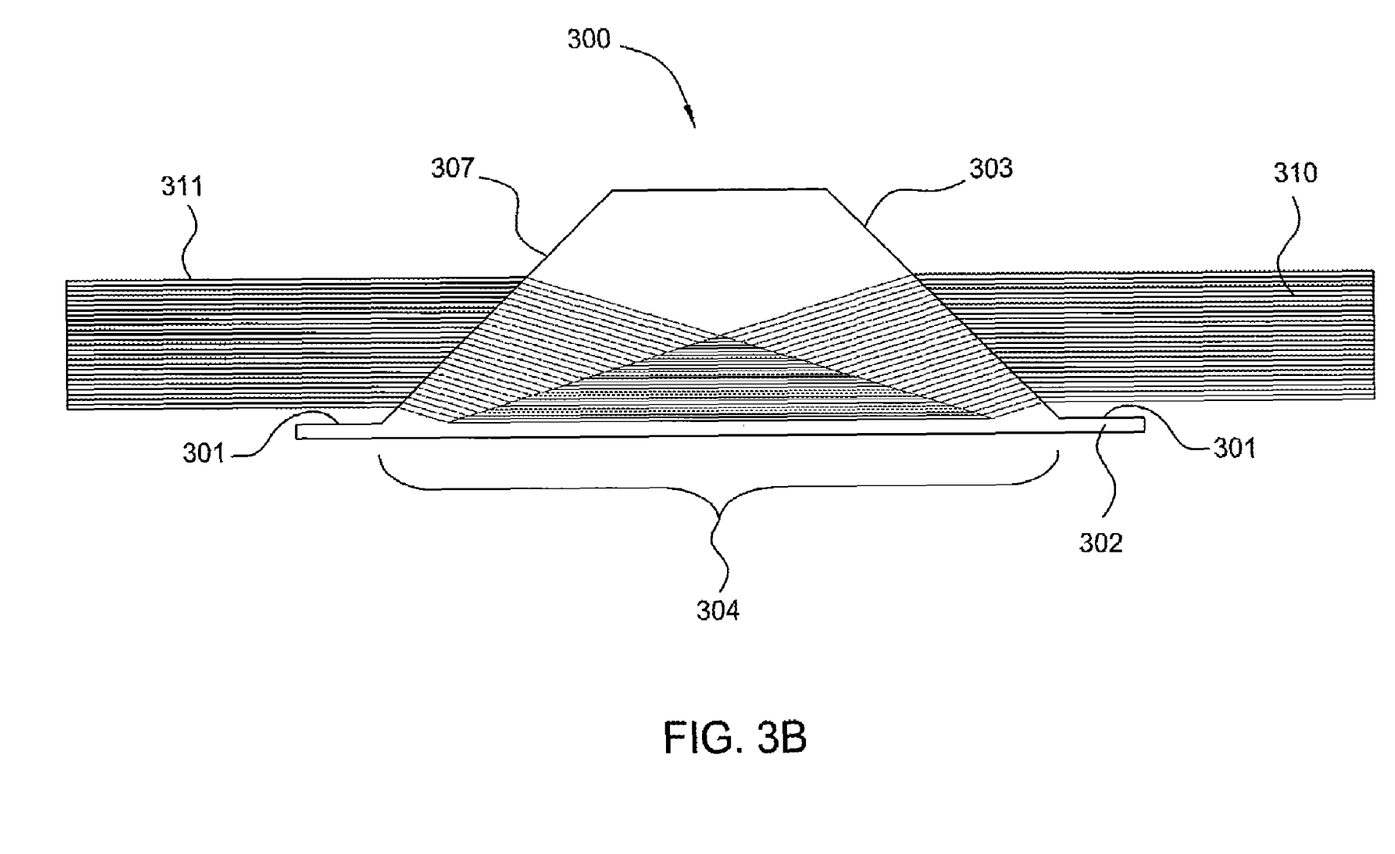
FIG. 3B is a side view of a dove prism mounted to an optical interface surface.

FIG. 3A is a perspective view of a dove prism 300 mounted to the optical interface surface 301 of a piezoelectric plate 302. FIG. 3B is a side view of dove prism 300 mounted to the optical interface surface 301. Referring to FIGS. 3A, 3B, a light beam 310, which is a coherent, unmodulated light beam, is directed through a first sloped face 303 of the dove prism 300. The light beam 310 refracts off of a first sloped face 303 and is directed onto a long face 304 of the dove prism 300. The electrode 320 and reflector 321 form an IDT 323 configured as a resonator, similar to IDT 202 described in conjunction with FIG. 2. Electrode 320 and reflector 321 are oriented and spaced to produce a standing SAW on optical interface surface 301. The IDT 323 is adapted to produce a SAW on the optical interface surface 301, thereby modulating the light beam 310 at the fundamental frequency of the SAW. The angle at which the light beam 310 encounters long face 304 is less than the critical angle and, therefore, light beam 310 reflects off of the optical interface surface 301 via TIR. The light beam 310 reflects off of optical interface surface 301 as modulated light beam 311, which is then refracted to the original direction of propagation of light beam 310 by a second sloped face 307 of the dove prism 300.

In one configuration, a second IDT 333 that includes an electrode 330 and a reflector 331 may be mounted onto opposing edge regions of the optical interface surface 301 as illustrated in FIG. 3A so that a second standing wave may be generated thereon. This configuration allows dithering of the coherent light beam along more than one axis for more complete averaging of the light beam.

The dove prism 300 may consist of any optical material that has an index of refraction that matches about that of piezoelectric plate 302 and has low absorptivity for the frequency of the light beam 310. In one embodiment, the piezoelectric plate 302 is a crystalline quartz plate and the dove prism 300 is composed of fused silica.

Figure 3C:
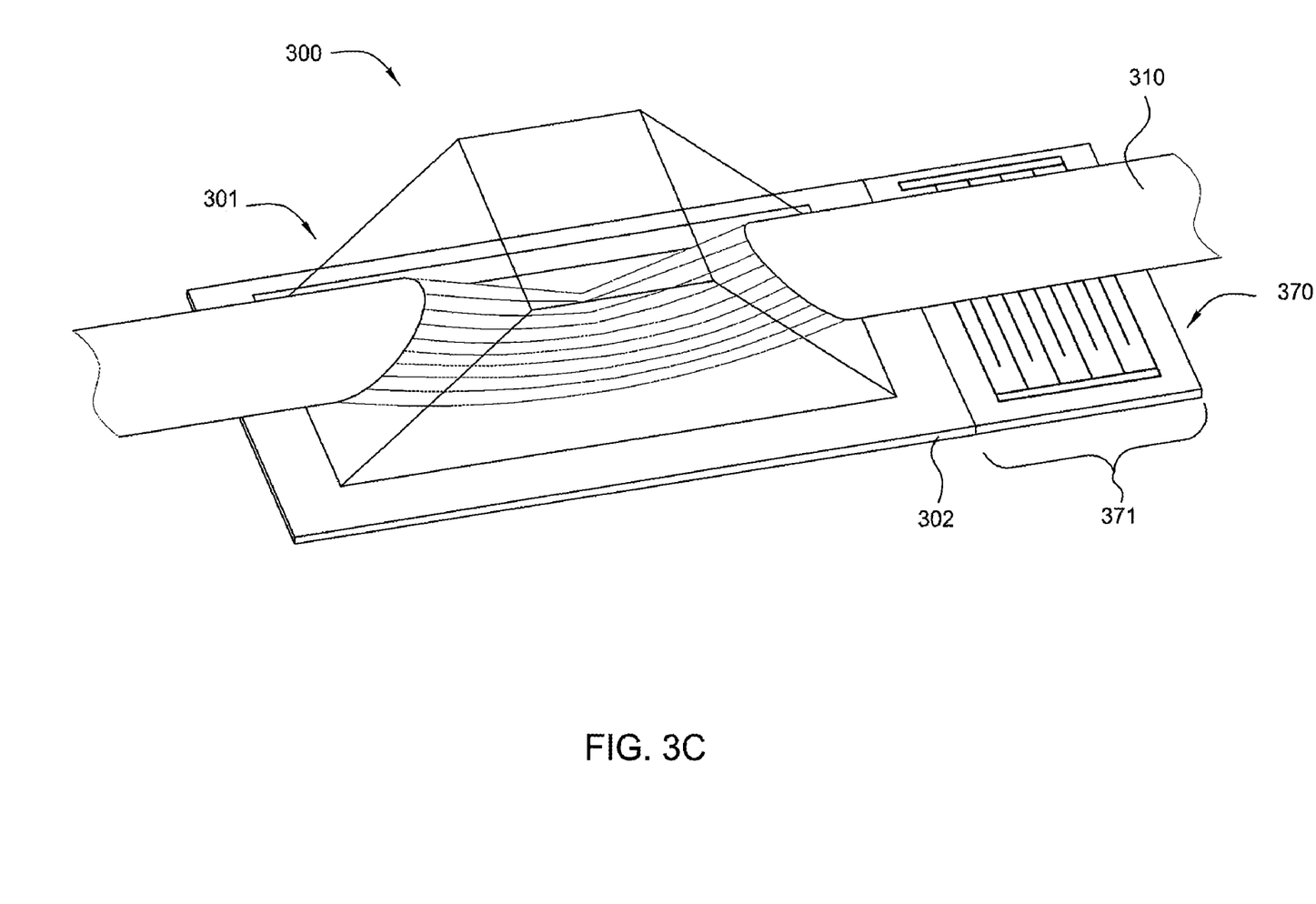
FIG. 3C illustrates a conventional interdigital transducer mounted on a distal region of a piezoelectric plate, wherein the distal region is adjacent an optical interface surface.

In another embodiment, a dove prism may be mounted on an optical interface surface 301 on which a traveling SAW is produced. FIG. 3C illustrates a conventional IDT 370 mounted on a distal region 371 of a piezoelectric plate 302, wherein the distal region 371 is out of the beam path of light beam 310 and therefore is located adjacent optical interface surface 301. In the same manner as IDT 202 described above in conjunction with FIG. 2, the IDT 370 generates a traveling SAW that travels across optical interface surface 301.

Figure 3D:
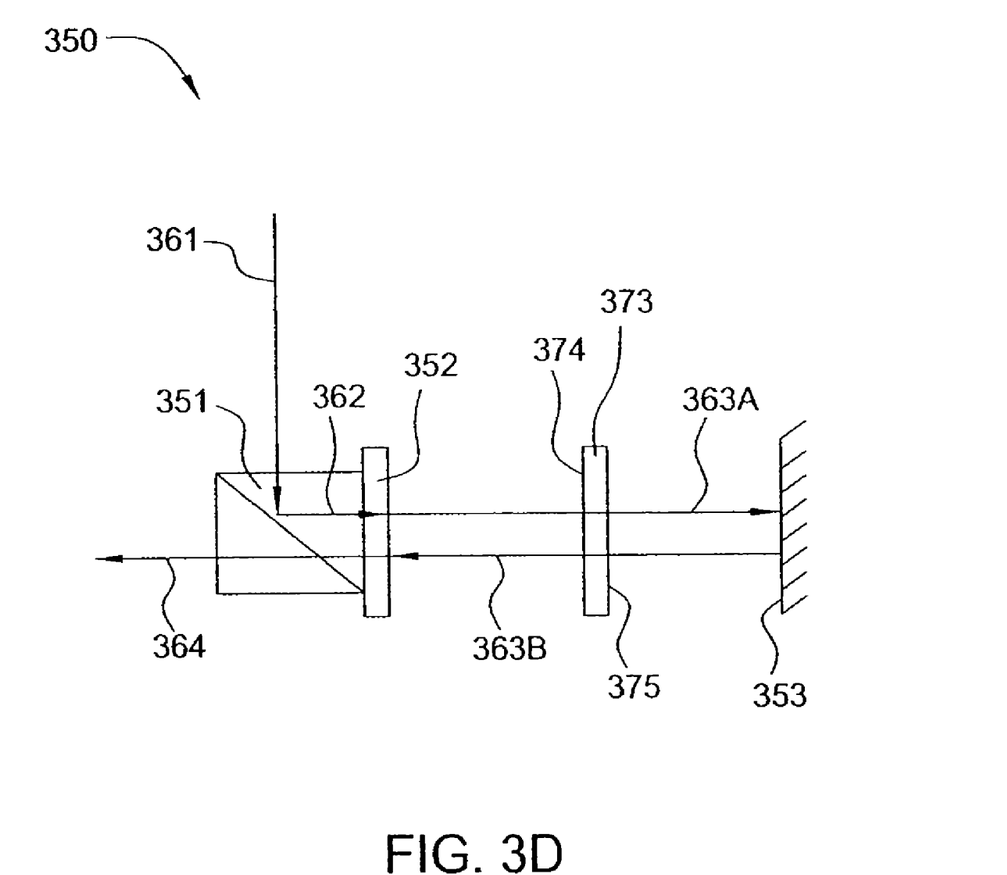
FIG. 3D illustrates an apparatus according to one embodiment of the invention that substantially eliminates reflective energy loss.

In another embodiment, the energy loss associated with reflection off of an optical interface surface may be reduced with when the optical interface surface is a light-transmitting surface. FIG. 3D illustrates an apparatus 350 according to one embodiment of the invention wherein a polarizing cube beam splitter 351, a quarter wave plate 352, and a highly reflective surface 353 are configured in such a way as to substantially eliminate reflective energy loss. Reflection losses occur whenever a beam of light is incident on a surface, even when the angle of incidence is normal to the surface. For a material such as crystalline quartz, reflective losses for a surface without an anti-reflective coating are about 4% per surface encountered by a light beam. Therefore, when an optical interface surface is a light-transmitting surface, i.e., a light beam enters and leaves the material of the optical interface surface, reflective losses may be as high as about 8%; 4% for the air-quartz interface and 4% for the quartz-air interface. Anit-reflective coatings are generally very destructive to a SAW and hence are not used on the optical interface surface of a light dithering device, such as surface 374 of beam modulator 373.

The apparatus 350 is configured to eliminate reflective losses from surfaces 374, 375 of beam modulator 373. Linearly polarized light beam 361 is a beam of linearly polarized light, such as laser light, and is directed onto the polarizing cube beam splitter 351, which reflects essentially all of the incident light as S-polarized beam 362. S-polarized beam 362 passes through quarter wave plate 352, also referred to as a quarter wave retarder, which transmits the incident light as circularly polarized light beam 363A. A wave plate, or retarder, is an optical device that alters the polarization state of a light wave travelling therethrough. A quarter wave plate creates a quarter wavelength phase shift and can change linearly polarized light to circularly polarized and vice versa. Circularly polarized light beam 363A then passes through beam modulator 373 and is dithered without experiencing any change to its polarization state. Approximately 4% of the incident energy reflects off of surface 374 of beam modulator 373 when circularly polarized light beam 363A encounters beam modulator 373. An additional 4% of the incident energy reflects off of surface 375 of beam modulator 373 as circularly polarized light beam 363A leaves the material of beam modulator 373. Circularly polarized light beam 363A then reflects off of highly reflective surface 353 as circularly polarized light beam 363B, passes through beam modulator 373 a second time, and then passes back through quarter wave plate 352, which transmits the incident circularly polarized light beam 363B as linearly polarized light beam 364. The polarization of linearly polarized light beam 364 is rotated 90°, i.e., it is P-incident, and therefore passes through the beam-splitting face of polarizing cube beam splitter 351.

The apparatus 350 reduces reflective losses to essentially zero because light reflected off of surfaces 374, 375 is directed out of apparatus 350 along the identical beam path as the non-reflected light, i.e., along the beam path of linearly polarized light beam 364. This is because quarter wave plate 352, surfaces 374,375, and highly reflective surface 353 are all positioned parallel to each other and, hence, the angle of incidence of any of the light beams thereon is normal. Total reflective losses for apparatus 350 may be as low as about 1%.

Figure 4:
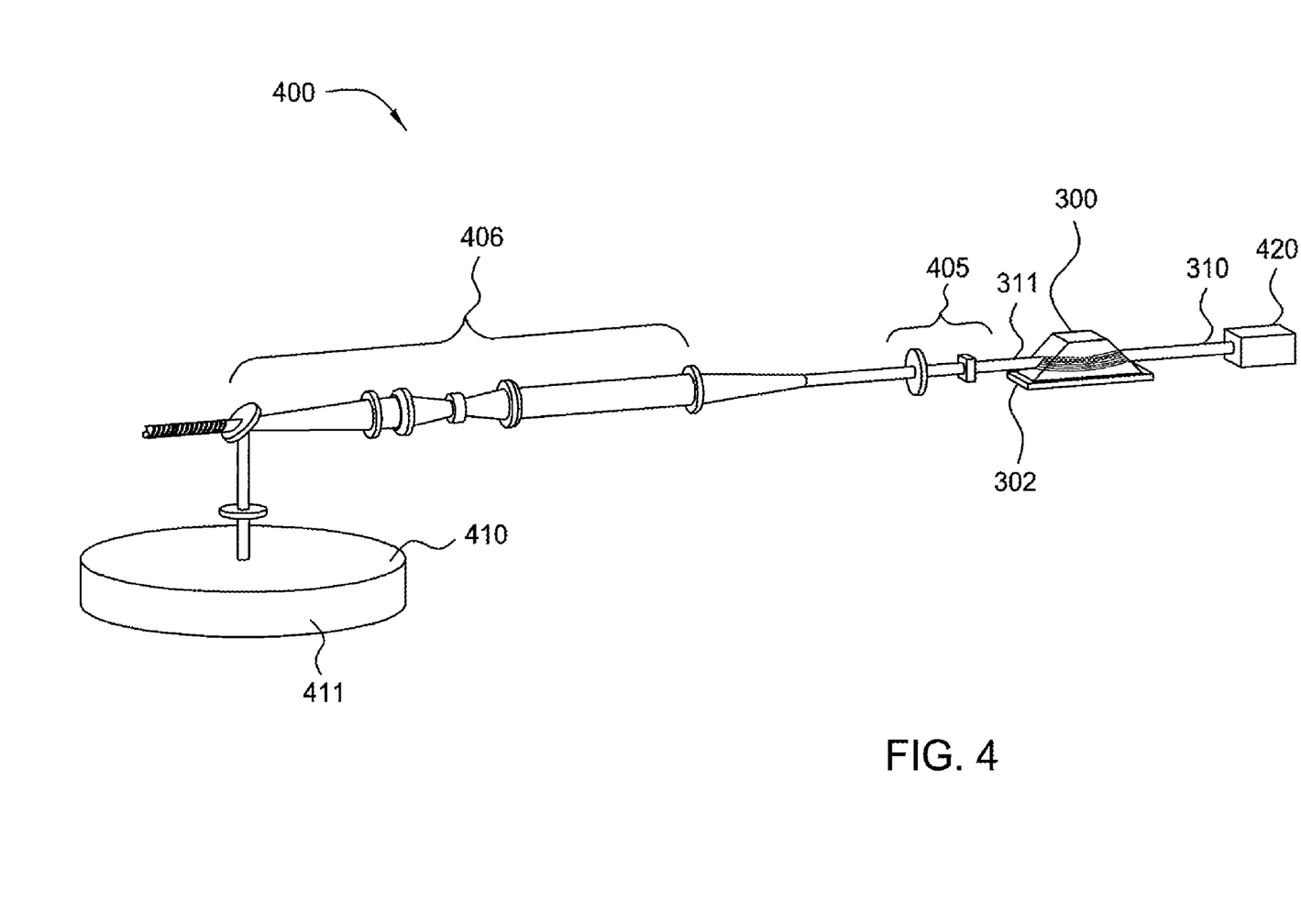
FIG. 4 schematically illustrates one aspect of the invention incorporated into a laser anneal system.

FIG. 4 schematically illustrates one embodiment of the invention incorporated into a laser anneal system 400. A coherent light source 420, such as a pulse laser, directs light beam 310 onto dove prism 300, which is mounted to the piezoelectric plate 302. The light beam 310 is a high energy, short duration pulse of laser light, for example having an energy intensity of at least about 0.1 J/cm$^2$ for approximately 10 ns to 100 ns, such as about 40 ns. The wavelength of the light may be between about 10 nm and about 1,000 µm. The Dove prism 300 reflects light beam 310 off of piezoelectric plate 302, which has a standing wave SAW with a fundamental frequency of about 200 MHz present on its surface. The SAW is produced by an IDT (not shown for clarity), which may be configured as a dual resonator similar to IDT 320 and IDT 330, as described above in conjunction with FIG. 3A. The modulated light beam 311 is refracted out of the dove prism 300 along the same direction of propagation as the light beam 310 and through a homogenizer 405. The homogenizer 405 is adapted to produce a homogeneous beam profile, i.e., a flat-top beam profile, from the non-flat beam profiles produces by lasers, such as a gaussian beam profile. For a non-coherent light source, the homogenizer 405 would ordinarily be adequate to ensure uniform illumination of a target area from a high power light source. However, a homogenizer does not prevent coherence effects on a target area of a coherent light beam. Modulated light beam 311 is then directed through a series of projection optics 406 onto a substrate 410, which is supported by substrate support 411. Because the modulated light beam 311 is substantially smaller in cross-sectional area than the surface of substrate 410, substrate support 411 may be adapted to translate substrate 410 relative to modulated light beam 311 so that all surfaces of substrate 410 may be processed with modulated light beam 311. It is also contemplated that the beam may be moved relative to the substrate support 411, or that both the modulated light beam 311 and substrate support 411 move so that modulated beam 311 may be scanned across a predetermined region of the surface of the substrate 410.

While the foregoing is directed to embodiments of the present invention, other and further embodiments of the invention may be devised without departing from the basic scope thereof, and the scope thereof is determined by the claims that follow.

What is claimed is:

1. An apparatus for processing a coherent light pulse, comprising:
    a piezoelectric material having an optical interface surface that comprises a substantially light-reflecting surface; and
    a surface acoustic wave (SAW) producing device disposed on the piezoelectric material for producing a SAW that alters the characteristics of light incident on the optical interface surface, wherein the SAW-producing device comprises an interdigital transducer (IDT) mounted on the piezoelectric material and proximate the light-reflecting surface, the IDT having:
        an electrode disposed on a first edge of the light-reflecting surface;
        a reflector disposed on a second edge of the light-reflecting surface, wherein the reflector is opposite and substantially parallel to the electrode; and
        a spacing between the electrode and the reflector selected to produce a standing SAW on the light-reflecting surface between the electrode and the reflector.

2. The apparatus of claim 1, wherein the IDT further comprises:
    a second electrode disposed on a third edge of the light-reflecting surface;
    a second reflector disposed on a fourth edge of the light-reflecting surface, wherein the second reflector is opposite and substantially parallel to the second electrode; and
    a second spacing between the second electrode and the second reflector selected to produce a standing SAW on the light-reflecting surface between the second electrode and the second reflector.

3. The apparatus of claim 1 further comprising:
    as dove prism mounted on the light-reflecting surface, wherein an internal reflective surface of the dove prism is in direct contact with the light-reflecting surface.

4. The apparatus of claim 3, wherein the dove prism comprises an optical material that has an index of refraction that is substantially the same as an index of refraction of the piezoelectric material.

5. The apparatus of claim 4, wherein the piezoelectric material comprises crystalline quartz and the dove prism comprises fused silica.

6. An apparatus for processing a coherent light pulse, comprising:
a piezoelectric material having an optical interface surface that comprises a substantially light-reflecting surface;
a first surface acoustic wave (SAW) producing device disposed on the piezoelectric material for producing a first SAW that alters the characteristics of light incident on the optical interface surface, wherein the SAW-producing device comprises an interdigital transducer (IDT) mounted on the piezoelectric material and proximate the light-reflecting surface, the IDT having:
an electrode disposed on a first edge of the light-reflecting surface;
a reflector disposed on a second edge of the light-reflecting surface, wherein the reflector is opposite and substantially parallel to the electrode; and
a spacing between the electrode and the reflector selected to produce a standing SAW on the light-reflecting surface between the electrode and the reflector; and
a second SAW-producing device disposed on the piezoelectric material and configured to produce a second SAW along an axis of transmission that is not aligned with an axis of transmission of the first SAW-producing device.

7. An apparatus for processing a coherent light pulse, comprising:
a piezoelectric material having an optical interface surface that comprises a substantially light-transmitting surface;
a surface acoustic wave (SAW) producing device disposed on the piezoelectric material for producing a SAW that alters the characteristics of light incident on the optical interface surface;
a highly reflective surface oriented substantially parallel to the light-transmitting surface;
a quarter wave plate having a first surface and positioned substantially parallel to the light-transmitting surface; and
a polarizing cube beam splitter configured to direct a coherent light pulse through the quarter wave plate at an angle normal to the first surface, through the light-transmitting surface, and onto the highly reflective surface.

8. The apparatus of claim 7, wherein the SAW-producing device comprises:
an IDT mounted on the piezoelectric material and proximate the light-transmitting surface.

9. The apparatus of claim 8, wherein the piezoelectric material has a second surface opposite the light-transmitting surface, wherein the second surface comprises an anti-reflective coating.

10. The apparatus of claim 8, wherein the IDT is oriented to propagate a SAW across the light-transmitting surface.

11. The apparatus of claim 8, wherein the IDT comprises:
an electrode disposed on a first edge of the light-transmitting surface;
a reflector disposed on a second edge of the light-transmitting surface, wherein the reflector is opposite and substantially parallel to the electrode; and
a spacing between the electrode and the reflector selected to produce a standing SAW on the light-transmitting surface between the electrode and the reflector.

12. The apparatus of claim 11, wherein the IDT further comprises:
a second electrode disposed on a third edge of the light-transmitting surface;
a second reflector disposed on a fourth edge of the light-transmitting surface, wherein the second reflector is opposite and substantially parallel to the second electrode; and
a second spacing between the second electrode and the second reflector, selected to produce a standing SAW on the light-transmitting surface between the second electrode and the second reflector.

13. An apparatus for processing a substrate, comprising:
a substrate support configured to position a substrate in the path of a pulse of coherent light;
a piezoelectric material having an optical interface surface;
a surface acoustic wave (SAW) producing device disposed on the optical interface surface for producing a SAW that alters the characteristics of light incident on the optical interface surface;
a coherent light source arranged to direct a pulse of coherent light on the optical interface surface; and
projection optics configured to direct the pulse of coherent light from the optical interface surface to the substrate wherein at least one of the substrate support, the projection optics, or the optical interface surface is configured to provide relative motion between the pulse of coherent light and the substrate.

* * * * *

UNITED STATES PATENT AND TRADEMARK OFFICE
CERTIFICATE OF CORRECTION

PATENT NO.         : 7,548,364 B2                                      Page 1 of 1
APPLICATION NO. : 11/461395
DATED              : June 16, 2009
INVENTOR(S)        : Jennings

It is certified that error appears in the above-identified patent and that said Letters Patent is hereby corrected as shown below:

Column 5, Line 19, please delete "With" and insert --with-- therefor;

Column 9, Line 8, please delete "Anit-reflective" and insert --Anti-reflective-- therefor.

Signed and Sealed this

Eighteenth Day of August, 2009

David J. Kappos
*Director of the United States Patent and Trademark Office*